Patented July 2, 1940

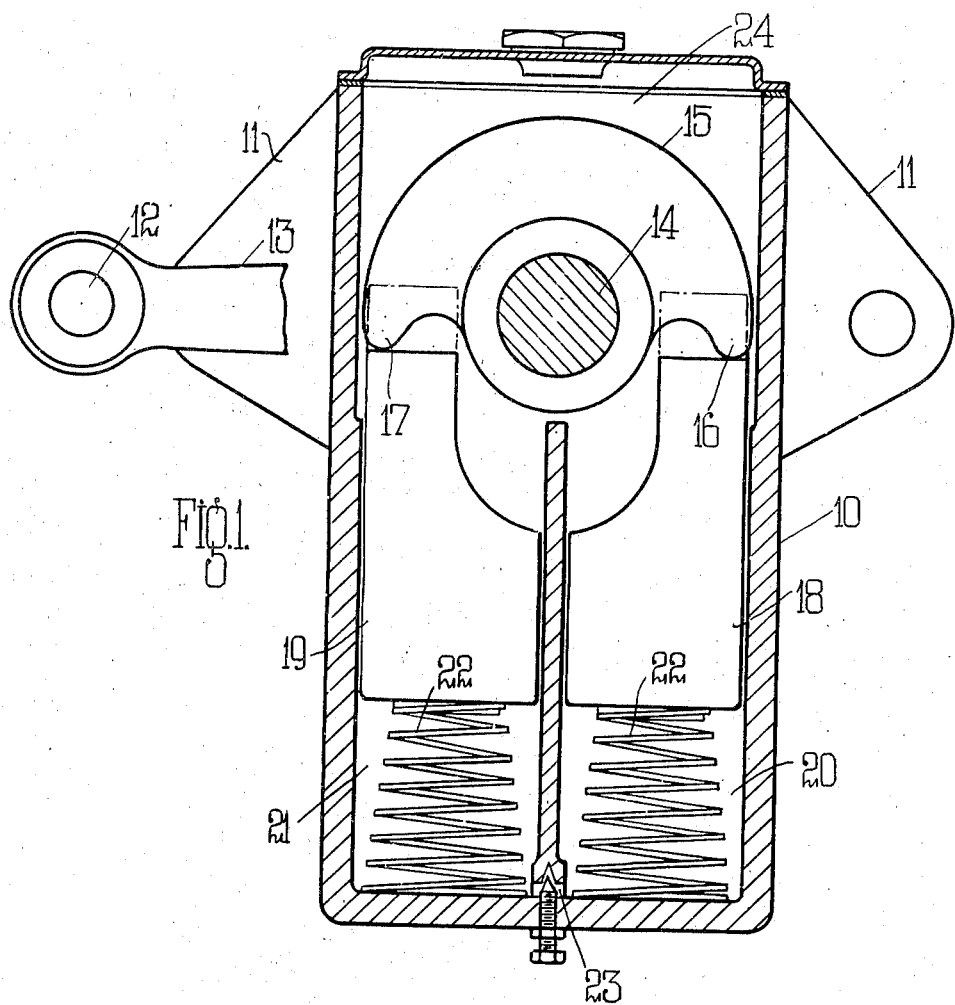

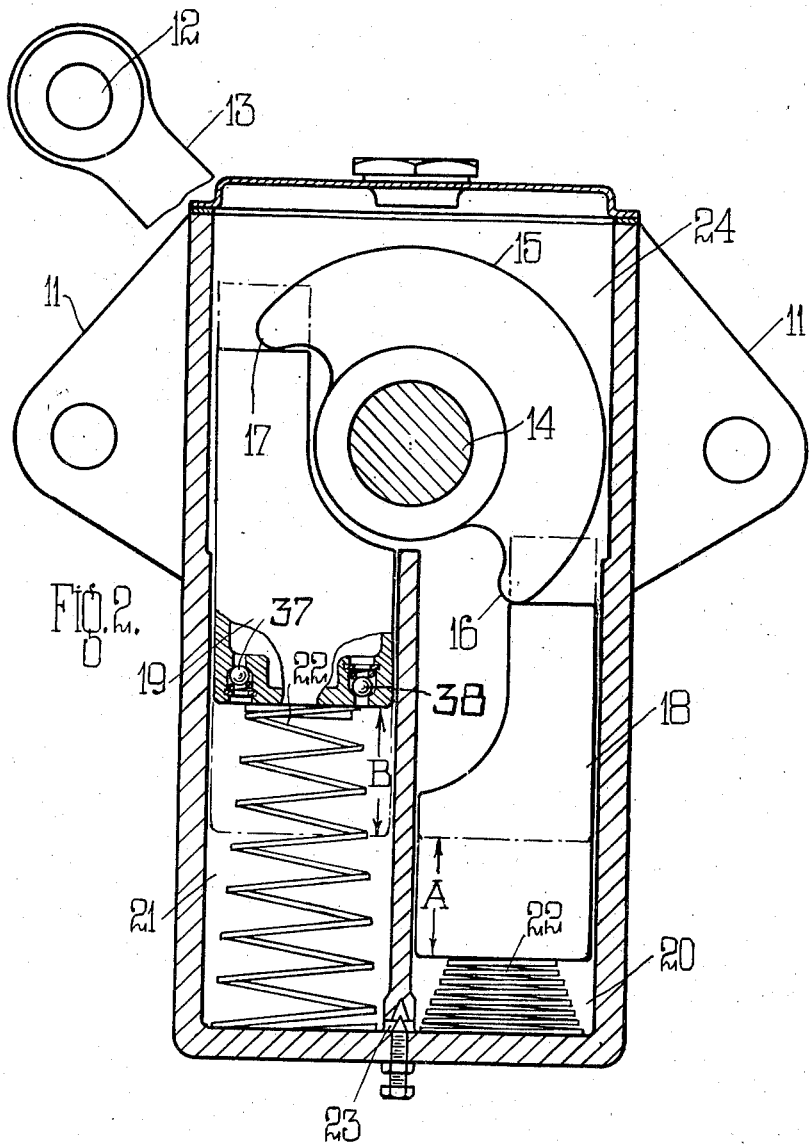

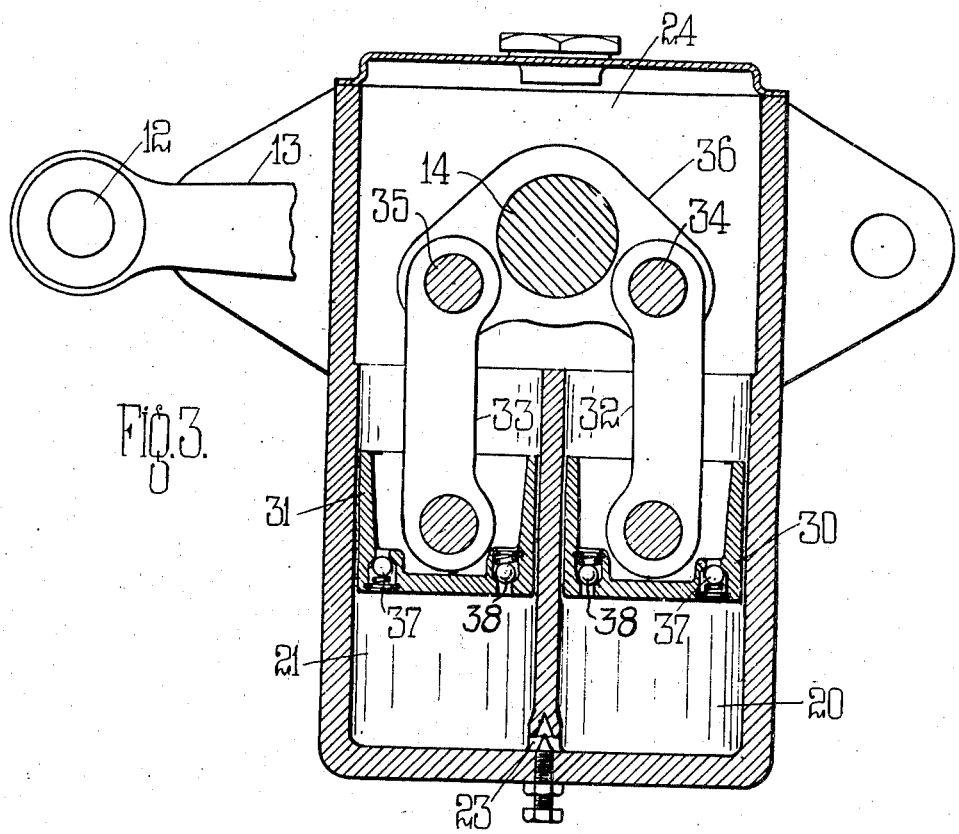

2,206,800

UNITED STATES PATENT OFFICE 2,206,800

HYDRAULIC SHOCK ABSORBER

Fullerton George Gordon Armstrong, Beverley, England, assignor to The Armstrong's Patents Company Limited, Beverley, England Application November 19, 1938, Serial No. 241,440
In Great Britain January 25, 1938

3 Claims. (Cl. 188—88)

The present invention relates to hydraulic shock absorbers and the like differential pressure operated damping means of the type adapted for use as auxiliaries to springs in the suspension of vehicle bodies and wherein one or more restricted passages form a resistance to fluid flow between the parallel cylinders of a pair of pistons or plungers on longitudinal displacement of the latter under the control of an angularly displaceable lever or crank operatively connected for engaging with the pistons.

In the spring suspension of vehicle bodies on wheels the springs are loaded to a predetermined degree in order to maintain the body in equilibrium under normal circumstances of use. When, however, one or more wheels of a vehicle meet an obstruction in the road along which it is travelling which causes relative inward movement of the wheel or wheels and the vehicle body, the springs become loaded to a greater extent with the result that on returning to their normal position, said springs tend to displace the body relatively to the wheels in a more violent or rapid manner than on the said inward movement.

Substantially the same conditions apply when relative outward movement of the body and wheels from their normal position occurs, such as for example, on cornering or when a wheel enters a large pot-hole in the road, in that the rebound movement commencing with the unsupported springs in an unloaded state is more violent or rapid than on the outward movement which commences when the springs are normally loaded.

The primary object of the present invention is to overcome this difficulty and accordingly a greater resistance to fluid flow in the shock absorber or the like differential pressure operated damping means used in association with the vehicle springs, is effected on the return movement of either piston in both directions towards its normal position than on the outward movement in reverse directions away from said normal position.

The invention is more particularly described with reference to the accompanying drawings, in which:

Figure 1 is a diagrammatic view of one form of construction with the pistons in their normal position.

Figure 2 is a corresponding diagrammatic view of the construction according to Figure 1 but with one piston substantially at the end of its compression stroke and the other piston at the end of its suction stroke.

Figure 3 is a diagrammatic sectional view of a modified form of construction showing the pistons in their normal position.

In the construction according to Figures 1 and 2, a shock absorber casing 10 has brackets 11 by which it is mounted on the body of a vehicle. The end 12 of a lever 13 is connected by a link or other suitable means, not shown, to a wheel of a vehicle, the opposite end of the lever 13 being connected to a shaft 14 which is angularly displaced with the lever. The shaft carries a crank 15 which has nose pieces 16, 17, on opposite sides of the axis of the shaft for engagement respectively with pistons 18, 19 which are displaceable, with clearance for oil leakage, within cylinders 20, 21.

The arrangement is such that with a vertically disposed shock absorber casing 10 and in the normal position of the pistons as shown in Figure 1, the nose pieces 16, 17 of the crank 15 engage with the tops of the pistons 18, 19, respectively in a plane considerably below the horizontal plane containing the axis of rotation of the shaft 14.

As a result, should the crank rotate in a clockwise direction a vertical component of downward displacement of the piston 18 is less than the vertical component of upward displacement of the piston 19, this being due to the fact that the nose piece 16 on angular displacement of the crank 15 is not called upon to cross a horizontally disposed diametral line through the axis of the shaft 14, whereas the other nose piece 17 crosses said line in its upward displacement thereby giving a greater vertical component to its movement.

Should the crank rotate in the opposite direction, i. e., in an anti-clockwise direction the nose piece 16 and its piston 18 rises by a greater amount than the descent of the nose piece 17 and its piston 19.

Compressive movement of the pistons 18, 19 is resisted by springs 22, whilst a valve controlled conduit or bore 23 is provided between chambers 20, 21. This valve controlled bore is shown diagrammatically only as it forms no part of the invention which resides in the differential displacement of the pistons 18, 19, on angular movement of the crank. Accordingly, any form of passage which may or may not be valve controlled, may be utilised in regulating the flow of liquid between the piston chambers 20, 21, on angular rotation of the crank.

Examination of Figure 2 discloses that the extent of downward displacement of the piston 18 is equal to the dimension A, whilst the upward movement of the piston 19 is equal to the dimension B which is greater than that of A. The same difference in piston displacements is effected on reverse rotation of the crank 15, that is to say the piston 18 ascends from the normal position by a greater amount than the descent of the piston 19. This is due to the fact that in this construction the axes of piston displacement are parallel whilst in the normal position of the pistons the nose pieces 16, 17 of the crank engage with the pistons in a lateral plane which is nearer the pistons than a parallel plane passing through the axis of the crank shaft 14.

In operation, during descent of the piston 18 from the normal position and ascent of the piston 19 therefrom, the ascending piston 19 sweeps a greater volume of its piston chamber 21 than does the piston 18 of its chamber 20, and as this greater volume is taken up by liquid passing through the valve controlled bore 23 and by liquid passing from the reservoir 24 through a one way valve 37 in the piston 19, it follows that on the rebound stroke the piston 19 in descending to its normal position under the action of the crank 15 is called upon to displace more fluid than can be accommodated in the piston chamber 20, with the result that it must force liquid between the wall of either piston and its chamber 20, 21, respectively, into the reservoir common to both chambers thereby creating a greater resistance to fluid flow between the cylinders than on the compression stroke of the piston 18. In other words, a greater resistance to movement of the pistons 18, 19 is effected on returning to their normal position than on their outward stroke from said normal position.

Exactly the same conditions apply should the crank 15 be initially rotated in the reverse direction due to the fact that the pistons are of similar construction and the shock absorber is symmetrical about its mid-vertical plane between the two cylinders.

In order to enable either piston chamber 20, 21 to receive liquid from the reservoir 24 during the ascent of its piston from the normal position, the pistons may be provided with one-way valves as shown in Figure 3. In order to prevent rotation of the pistons about their own axes within their piston chambers, the upper ends of the pistons are bifurcated as shown in chain dotted lines with the bifurcated portions engaging on opposite sides of the crank 15.

The construction according to Figure 3 operates in a manner similar to that of the construction according to Figures 1 and 2, the only difference between said constructions being that the right and left hand pistons 30, 31, are connected by rods 32, 33, respectively with pivot pins 34, 35 at the ends of the crank 36. Each of the pistons in its operative face, has a one-way valve 37. In this construction the distance apart of the pivot pins 34, 35 is equal to the spacing of the parallel axes of the pistons 30, 31, whilst the axes of the pins 34, 35 lie nearer the pistons than a plane extending through the axis of the shaft 14 in a direction normal to the direction of piston displacement.

It will be appreciated that on the outward stroke of the pistons from their normal position when one piston descends and the other piston ascends in its chamber, the valve 37 of the ascending piston opens to allow fluid to pass from the reservoir 24 into the piston chamber while the valve in the other piston remains closed.

On the rebound stroke, however, both valves 37 remain closed due to the fact that the rise in pressure created by the descending piston with its closed valve tends to force so much oil through the valve controlled orifice 23 that the pressure in the other piston chamber against the valve 37 is greater than the pressure exerted by fluid in the reservoir 24, with the result that as in the construction according to Figures 1 and 2, the sole method of escape of excess liquid is between a piston wall and the wall of its cylinder or chamber.

Preferably and as shown in Figure 3, the valves 37 are spring loaded.

In order to supplement the leakage between the piston and the cylinder walls in either form of construction a relatively heavily loaded spring relief valve 38 may be provided between either or both of the pistons and the recuperating chamber 24, said relief valve or valves 38 operating in the reverse direction to that of the valves 37 so as to enable fluid flow from either cylinder to the recuperating chamber when the pressure therein reaches a relatively high degree, without the possibility of creating a hydraulic lock.

It will be seen that with either construction according to the drawings, at the commencement of rebound, i. e. return movement of the pistons to their normal position, there is applied an increased resistance to piston displacement which relatively large resistance gradually decreases as the pistons approach their normal position. This favourable result applies irrespective of whether the vehicle chassis and the wheels are brought together to load the vehicle springs heavily, or are separated and the vehicle springs require additional support. In either event the increased resistance to movement of the shock absorber parts has the effect of tending to maintain the vehicle springs in that condition consistent with a substantially constant support of the vehicle body on the wheels.

I declare that what I claim is:

1. Differential pressure operated damping means for a pair of relatively displaceable members, comprising a casing adapted to be connected to one of said members, a pair of parallel cylinders within said casing, pistons reciprocable in said cylinders with a slight clearance between each piston and its cylinder wall, a valve controlled conduit between said cylinders, a reservoir common to both cylinders in said casing, a shaft connected to the other of said relatively displaceable members, a crank rigidly connected to said shaft for angular displacement in unison therewith on relative displacement between said displaceable members, and links pivotally connected to said crank with the centers of the pivotal connections disposed below a plane passing through the axis of the shaft at right angles to the axes of said cylinders and said links when the pistons are in their normal positions at the centers of their strokes, said links serving to connect said cranks with said pistons for causing either piston to sweep a greater volume of its cylinder on the suction part of its stroke during oscillation of said shaft whereby to effect a greater resistance to fluid flow on the return movement of either piston in both directions toward its normal position than on the outward movement in reverse directions away from the normal position, the increased volume of sweep of either piston being taken up by leakage of fluid through the slight clearance provided between the walls of either piston and its cylinder into said reservoir only on the return movement of said pistons toward their normal positions.

2. Differential pressure operated damping means for a pair of relatively displaceable members, comprising a casing adapted to be connected to one of said members, a pair of parallel cylinders within said casing, pistons reciprocable in said cylinders with a slight clearance between the piston and cylinder walls, a valve controlled conduit between said cylinders, a reservoir common to both cylinders in said casing, a shaft connected to the other of said members, a crank rigidly connected to the said shaft for angular displacement in unison therewith on relative displacement between said members, inter-engaging means between said crank and said pistons for ensuring that on angular displacement of said shaft either piston on the suction part of its stroke, away from the normal position of the piston when at the centre of its stroke, sweeps a greater volume of its cylinder than the other piston on the compression part of its stroke, in the opposite direction away from the normal position, whereby a greater resistance to fluid flow on the return movement of either piston towards its normal position following its suction stroke is effected than on the outward movement in the reverse direction away from said normal position, the said increased volume of sweep being taken up by leakage of fluid between the walls of either piston and its cylinder into said reservoir only on return movement of the pistons towards their normal positions and resiliently loaded relief valves in said pistons for supplementing the leakage paths between the walls of said pistons and their cylinders for eliminating the possibility of a hydraulic lock on piston displacement.

3. Differential pressure operated damping means for a pair of relatively displaceable members, comprising a casing adapted to be connected to one of said members, a pair of parallel cylinders within said casing, pistons reciprocable in said cylinders with a slight clearance between the piston and the cylinder walls, a valve controlled conduit between said cylinders, a reservoir common to both cylinders in said casing, a shaft connected to the other of said members, a crank rigidly connected to the said shaft for angular displacement in unison therewith on relative displacement between said members, inter-engaging means between said crank and said pistons for ensuring that on angular displacement of said shaft either piston on the suction part of its stroke, away from the normal position of the piston when at the centre of its stroke, sweeps a greater volume of its cylinder than the other piston on the compression part of its stroke, in the opposite direction away from the normal position, whereby a greater resistance to fluid flow on the return movement of either piston towards its normal position following its suction stroke is effected than on the outward movement in the reverse direction away from said normal position, the said increased volume of sweep being taken up by leakage of fluid between the walls of either piston and its cylinder into said reservoir only on return movement of the pistons towards their normal positions, a valve in each piston which opens solely on the suction stroke thereof to allow of fluid flow from said reservoir to the chamber of the piston when undergoing the suction stroke, and a resiliently loaded relief valve in each piston operating in the reverse direction to that of said first mentioned valves for supplementing the leakage path between a piston wall and the wall of its cylinder.

FULLERTON GEORGE
GORDON ARMSTRONG.